United States Patent [19]

Kalua

[11] 4,449,886
[45] May 22, 1984

[54] APPARATUS FOR FINING BOTTLED WINE

[76] Inventor: John Kalua, 3416 Solano Blvd., Napa, Calif. 94558

[21] Appl. No.: 359,159

[22] Filed: Mar. 17, 1982

[51] Int. Cl.³ .............................................. C12G 1/00
[52] U.S. Cl. .................................... 414/776; 366/219; 99/277.2; 426/406; 426/490; 426/495
[58] Field of Search .............. 366/208, 219; 99/277.2; 414/776, 408, 420, 421; 426/8, 15, 405, 406, 490, 495

[56] References Cited

U.S. PATENT DOCUMENTS

| | | | |
|---|---|---|---|
| 3,046,157 | 7/1962 | Nyman | 366/219 X |
| 3,191,788 | 6/1965 | Hopfeld | 414/420 |
| 3,533,602 | 10/1970 | Heck et al. | 99/277.2 X |
| 3,750,810 | 8/1973 | Stanfill | 414/421 |
| 4,235,940 | 11/1980 | Williams | 99/277.2 X |
| 4,373,849 | 2/1983 | Robinson | 414/408 |

FOREIGN PATENT DOCUMENTS

| | | | |
|---|---|---|---|
| 2020252 | 11/1970 | Fed. Rep. of Germany | 99/277.2 |
| 2425475 | 12/1979 | France | 99/277.2 |

Primary Examiner—Robert J. Spar
Assistant Examiner—Ken Muncy
Attorney, Agent, or Firm—Harris Zimmerman; Howard Cohen

[57] ABSTRACT

An apparatus for manipulating bottles of wine to precipitate and collect sediments in the wine includes a base frame from which a pair of stanchions extend upwardly. A rectangular frame is disposed between the stanchions and pivotally supported by the stanchions to rotate about a horizontal axis. A generally cubic housing is disposed within the rectangular frame, and is pivotally supported by the frame on an axis which is perpendicular to the horizontal axis. The housing includes doors which permit the unloading of bins of wine bottles supported in the housing in parallel arrays. The housing may be rotated slowly while the frame is slowly pivoted, so that the wine bottles are gradually rotated and tipped from horizontal to vertical disposition, the sediments in the wine precipitating to the upper neck portion of each wine bottle.

15 Claims, 13 Drawing Figures

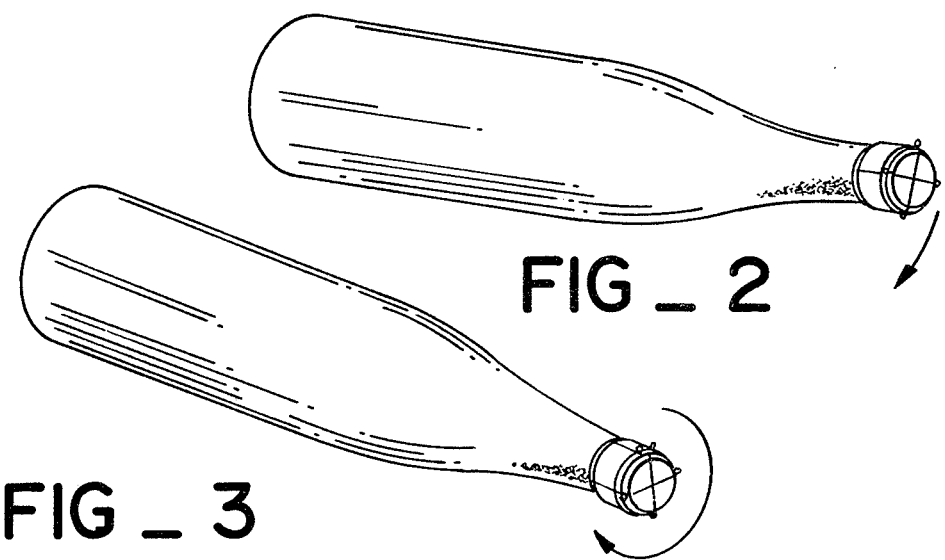
FIG _ 2
FIG _ 3
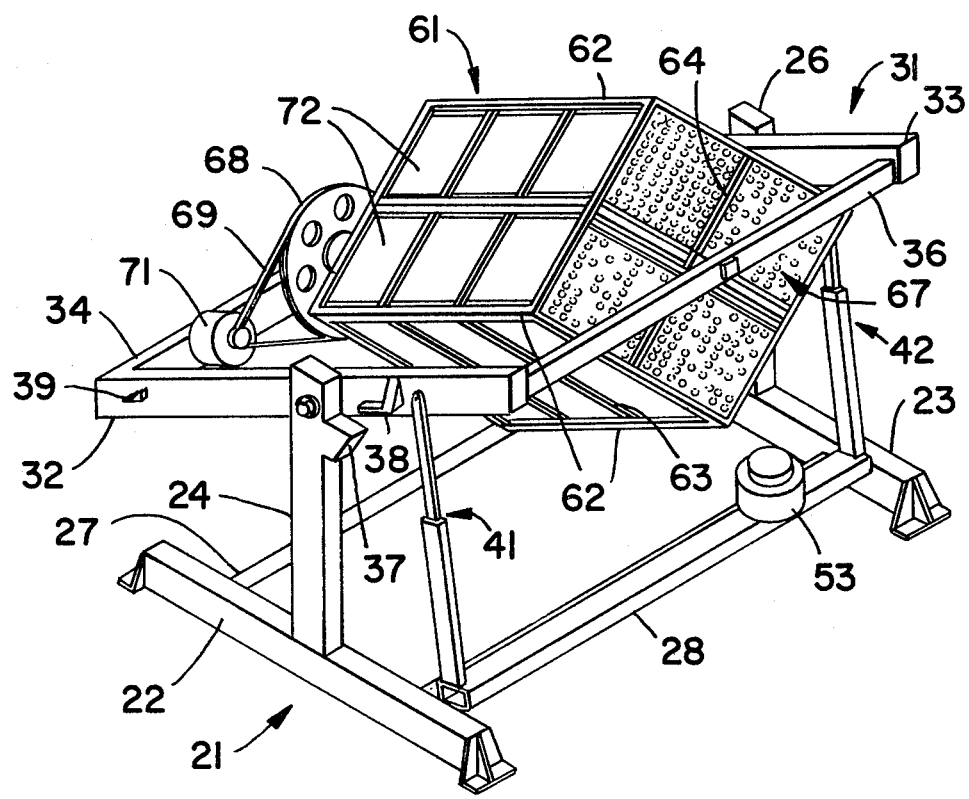
FIG _ 1

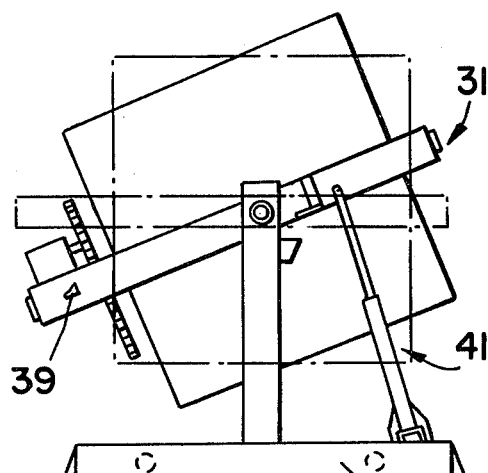
FIG_4
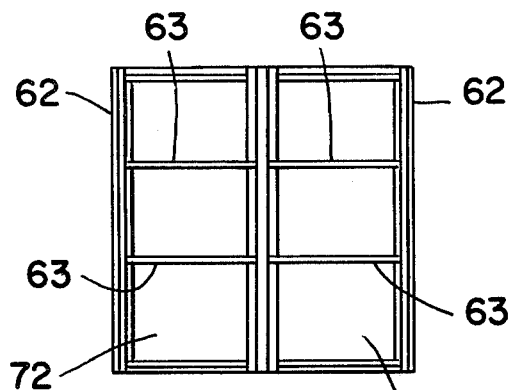
FIG_6
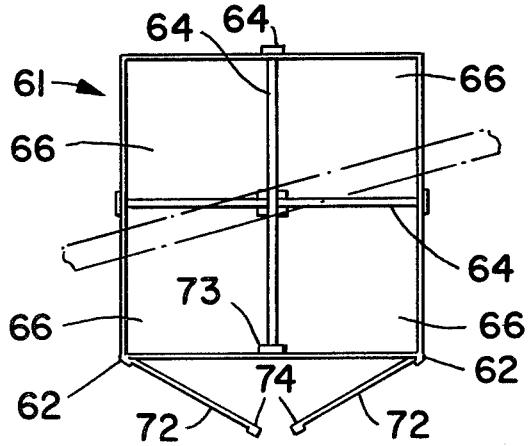
FIG_7
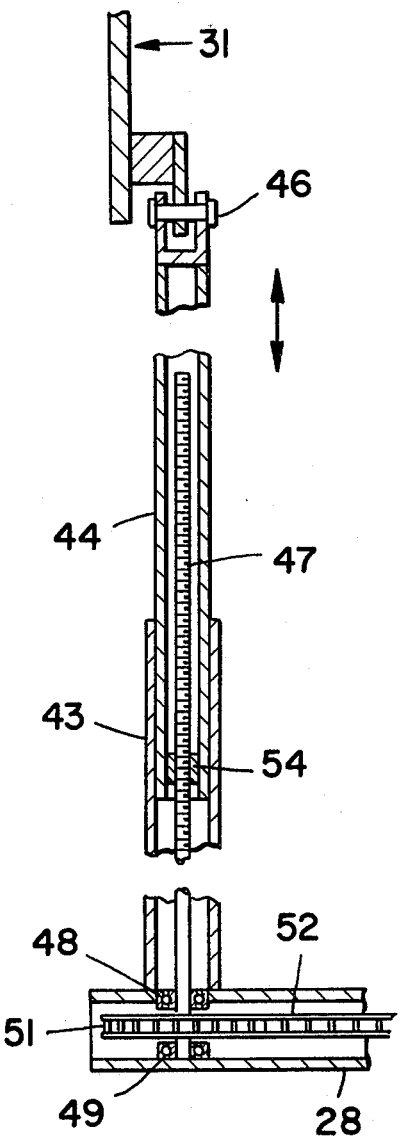
FIG_5

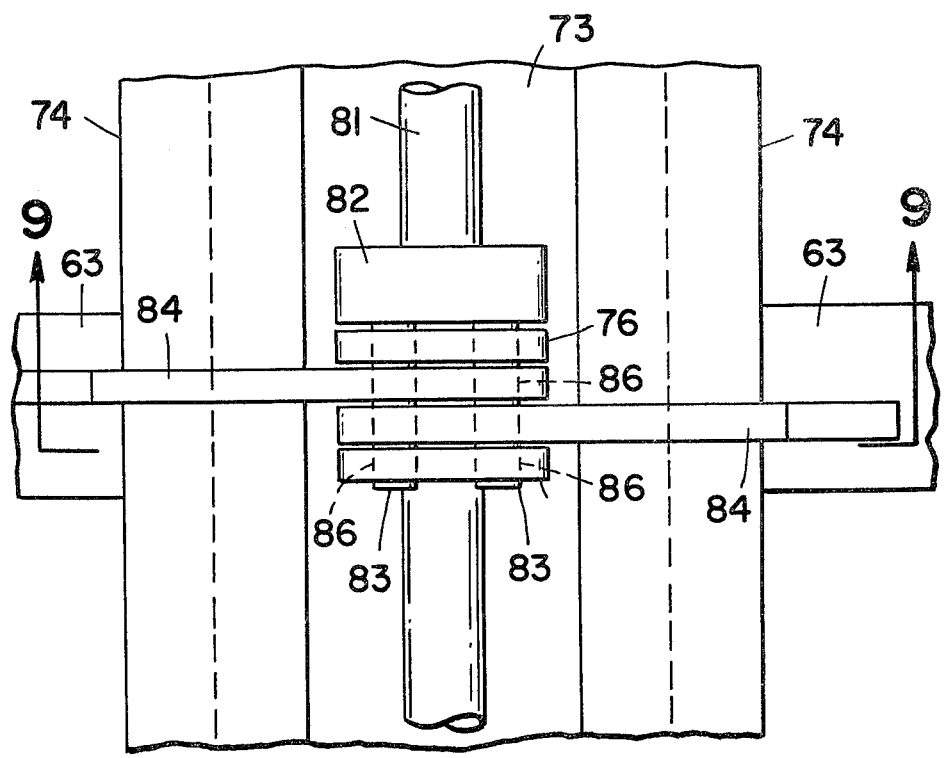
FIG_8
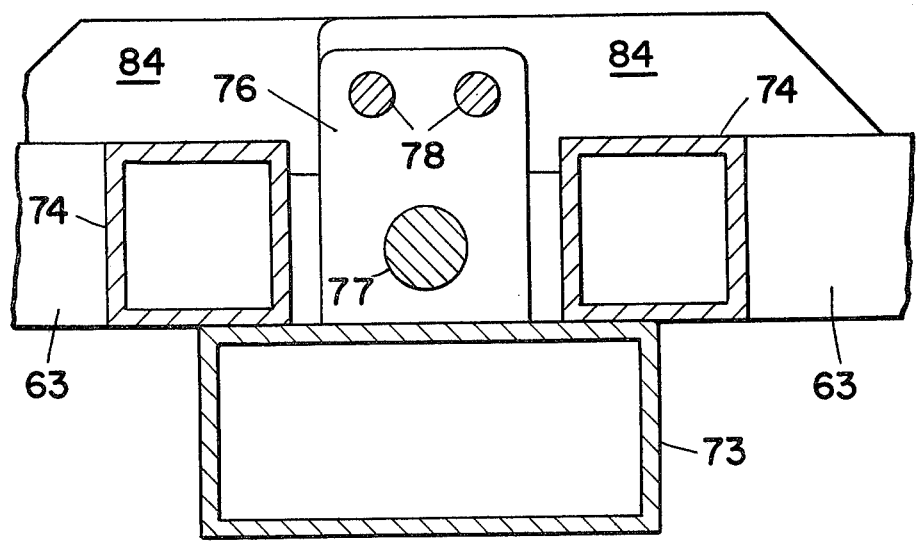
FIG_9

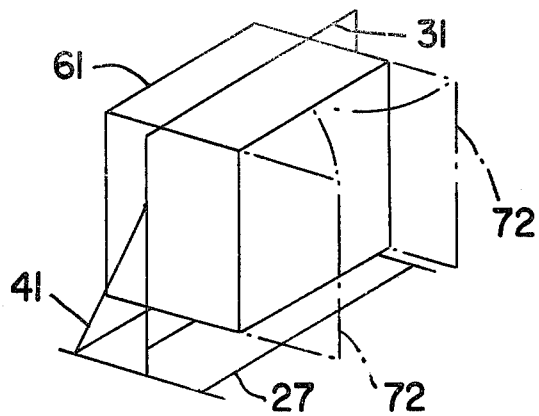
FIG_10
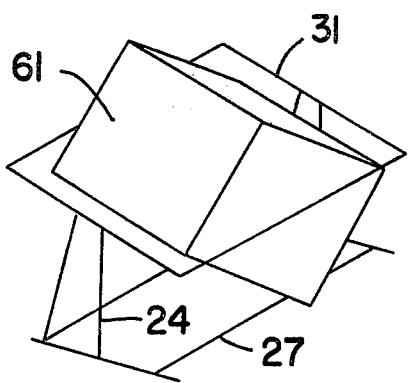
FIG_11
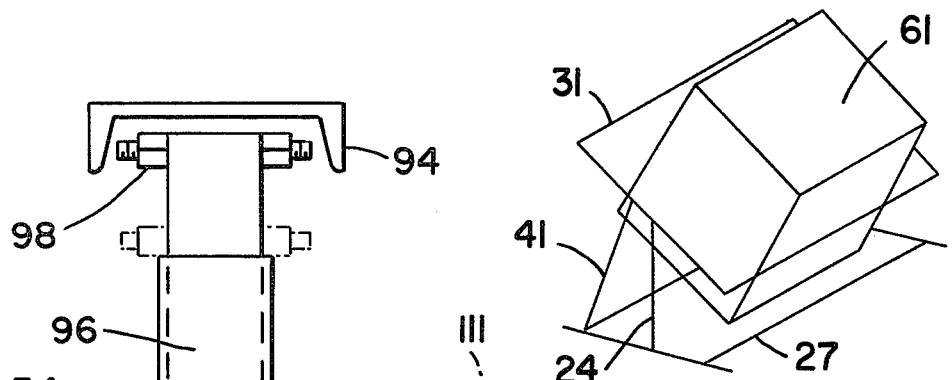
FIG_12
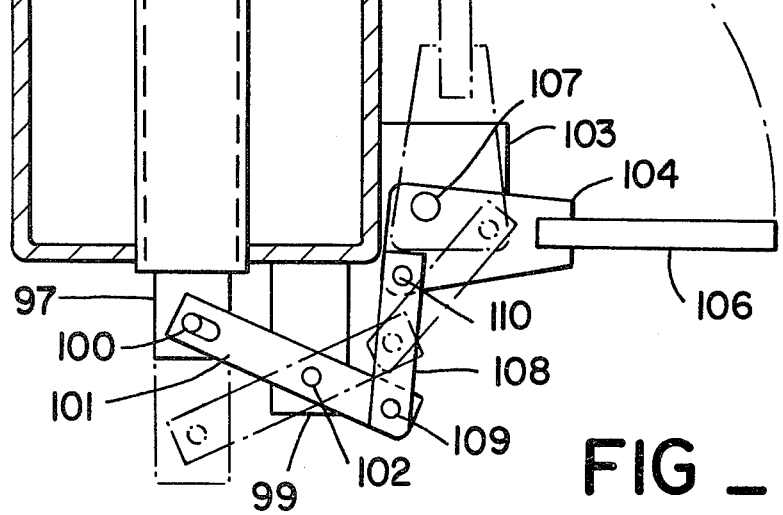
FIG_13

APPARATUS FOR FINING BOTTLED WINE

BACKGROUND OF THE INVENTION

In the finishing of fine still wines and sparkling wines, it is necessary to precipitate from the wine the sediments which arise as a result of the fermentation process. This is especially true of sparkling wines which undergo a secondary fermentation step after bottling.

The finely divided sediments precipitate at a slow rate, and exhibit a self-affinity which is only slightly greater than the affinity of the sediments for the inner surface of the bottle. As a result, it has become customary to place the bottles of wine in racks which hold the bottles in an oblique, downwardly slanting disposition, so that the sediments will precipitate towards the opening of the bottle. Furthermore, it has become customary to rotate the bottles periodically through a small angle about their axes, so that the agglomerating precipitants will sweep the inside surface of the bottle as they slowly descend toward the neck of the bottle. The rotating and tipping of the bottled wine is usually accomplished by hand; thus the procedure is extremely labor intensive and time-consuming. Moreover, the rotation and tipping which are applied to each bottle may vary, causing variations from bottle to bottle in the quality of the contents thereof. When the sediments are fully precipitated and deposited at the neck of the bottle, they may be removed by processes which form no part of the present invention.

SUMMARY OF THE PRESENT INVENTION

The present invention generally comprises an apparatus for rotating and tipping a large plurality of bottles of wine, so that the sediments in the wine may be precipitated and deposited in the upper neck portion of the bottles in optimum fashion. The apparatus of the present invention obviates the manual procedures customarily employed to encourage sedimentation in the bottled wine, and thus saves the time and expense of those prior art procedures. Furthermore, the apparatus of the present invention, by virtue of its capacity of thousands of bottles, assures that all of the bottles will undergo the same rotation and tipping, and will be of the same quality.

The apparatus of the present invention includes a base frame from which a pair of stanchions extend upwardly in parallel fashion. A rectangular frame is disposed between the stanchions and pivotally supported thereby to rotate about a horizontal axis. An extendable strut assembly is joined between the base frame and the rectangular frame, and is motor driven to alter the angular disposition of the rectangular frame. A generally cubic housing is disposed within the rectangular frame, and is pivotally supported thereby on an axis which is perpendicular to the horizontal axis. The housing includes an open upper end for loading bins of bottles aligned in parallel, generally horizontal fashion. The housing is driven by a motor mounted on the rectangular frame to rotate about its pivots.

The housing may be rotated slowly while the frame is slowly pivoted, so that the wine bottles are gradually rotated while being tipped from horizontal to vertical disposition. The housing includes doors which are latched to the housing and which open to permit the unloading of bins of wine bottles therein. The sediments in the wine thus are caused to precipitate to the upper neck portion of each wine bottle.

A BRIEF DESCRIPTION OF THE DRAWING

FIG. 1 is a perspective view of the apparatus of the present invention.

FIG. 2 is a perspective view of a typical wine bottle, showing the tipping motion provided by apparatus of the present invention.

FIG. 3 is a perspective view of a wine bottle, showing the rotational motion imparted thereto by the apparatus of the present invention.

FIG. 4 is a side elevation of the apparatus of the present invention.

FIG. 5 is an enlarged, detailed cross-sectional view of the frame elevating assembly of the present invention.

FIG. 6 is a plan elevation of the doors of the housing of the present invention.

FIG. 7 is a top view of the housing of the apparatus of the present invention.

FIG. 8 is a detailed plan view of the door locking assembly of the housing of the present invention.

FIG. 9 is an enlarged cross-sectional view of the door locking assembly, taken along line 9—9 of FIG. 8.

FIG. 10 is a schematic representation of the apparatus of the present invention, shown in its unloading disposition.

FIGS. 11 and 12 are schematic representations of the movement of the frame and housing portions of the apparatus of the present invention.

FIG. 13 is a cross-sectional view of the housing latching mechanism of the present invention.

DESCRIPTION OF THE PREFERRED EMBODIMENT

The present invention generally comprises an apparatus for supporting a large plurality of bottles wine, and for rotating the bottles (about their axes) and tipping the bottles (rotating the axes) to effect precipitation of the sediments in the wine. With reference to FIG. 1, the apparatus includes a base frame 21 which is composed of a pair of side rails 22 and 23. A pair of stanchions 24 and 26 extend upwardly from the side rails 22 and 23, respectively. A lateral brace 27 extends fixedly between like end portions of the rails 22 and 23, while a channel member 28 is pivotally secured to the opposite end portions of the rails 22 and 23.

The apparatus also includes a rectangular frame assembly 31 which is disposed between the stanchions 24 and 26. The frame assembly 31 is comprised of a pair of side members 32 and 33, and a pair of end members 34 and 36, extending between like ends of the side members in rectangular fashion. Medial portions of the side members 32 and 33 are pivotally secured to the upper ends of the stanchions 24 and 26, respectively, so that the entire frame 31 may rotate freely about a horizontal axis which passes through the upper ends of the stanchions. A pair of stop members 37 and 38 are secured to the stanchion 24 and side member 32, respectively. The stop members are disposed to impinge each upon the other when the frame 31 is rotated to a horizontal disposition. The impingement of stop members, of course, limits the rotation of the frame 31 to the horizontal position. Likewise, a stop member 39 on the side member 32 cooperatively engages another stop member (not shown) on the stanchion 24 to prevent the frame 31 from being rotated past a position in which the side members 32 and 33 are disposed in a generally vertical orientation. Thus the frame 31 is limited to a rotational movement of 90°.

The members which form the base frame and the rectangular frame may comprise rectangular tubular steel members which are of sufficient dimensions and strength to support the weight of the remainder of the apparatus, as well as the wine bottles contained therein.

The apparatus of the present invention also includes a pair of telescoping strut assemblies 41 and 42 extending between the side members 32 and 33, respectively, and the channel member 28. With reference to FIG. 5, each of the assemblies 41 and 42 includes a hollow, rectangular tubular member 43 fixedly secured at its lower end to the channel member 28. A smaller hollow, rectangular tubular member 44 is slidably received within the cavity of the tubular member 43 in telescoping fashion. The upper end of the member 44 is joined to the frame 31 by a pivot pin 46 which permits relative rotation between the telescoping members 43 and 44 and the rectangular frame 31.

A threaded shaft 47 extends through the interior cavities of the tubular members 43 and 44. The lower end of the shaft 47 extends into the interior cavity of the channel member 28, and is supported therein by bearings 48 and 49. A sprocket wheel 51 is secured to the lower end of the shaft 47 within the channel member 28. The sprocket wheel 51 engages a drive chain 52 disposed thereabout and extending the entire length of the channel member 28 to engage both of the sprocket wheels 51 of the two assemblies 41 and 42. A selectively controlled motor 53 is mounted on the channel member 28, and includes a drive sprocket which engages the chain 52 so that the sprocket wheels 51 may be rotated in concert. A nut 54 is disposed within the cavity of the tubular member 44, and is engaged by the threaded shaft 47. It may be appreciated that as the shaft is rotated by the sprocket wheel 51, the nut 54 will be driven to extend or retract the member 44 with respect to the member 43. The extension of the members 44 of both the assemblies 41 and 42 causes the frame 31 to rotate toward a vertical disposition. Conversely, the sprocket wheels 51 may be driven by the motor 53 through the chain 52 to retract the members 44 and rotate the frame 31 toward a horizontal disposition, as shown in phantom line in FIG. 4.

The apparatus of the present invention also includes a housing 61 which is generally cubic in configuration. The housing 61 is comprised of rectangular tubular members 62 which define the vertices at which the sides of the housing join. A plurality of side bars 63 extend between the members 62 and are spaced apart along the sides of the housing 61. With reference to FIGS. 1 and 7, a plurality of tubular members 64 bisect the sides of the housing 61 and extend to the central axis thereof to increase the structural rigidity of the housing. The members 64 also define within the housing 61 four bays 66, each bay being adapted to receive two large bins of wine bottles, each bin supporting up to four hundred bottles filled with wine. The upper end 67 of the housing 61 is substantially open, except for the presence of the members 64, so that rectangular bins containing a large number of filled wine bottles disposed in parallel, generally horizontal array may be loaded into the bays when the frame is tilted horizontally. The lower end of the housing 61 is constructed in substantially the same way as the side walls of the housing.

The housing 61 is joined to the rectangular frame 31 by means of bearing-supported pivots which extend from medial portions of the members 34 and 36 of the frame 31. The pivots are joined to the intersection of the members 64 at the top and bottom of the housing 61, as shown for example in FIG. 7. Secured to the lower pivot is a large sprocket wheel 68 which is driven through a chain 69 by a motor 71 mounted on the member 34 of the frame 31. It may be appreciated that the motor 71 may be selectively controlled to rotate the housing 61 about its axis.

The housing 61 includes a pair of doors 72 which comprise one entire side of the housing. The doors 72 are hingably secured to adjacent vertex members 62 of the structure, and are adapted to open outwardly from the center, as shown in FIG. 7. A rectangular tubular member 73 bisects and extends the length of the side on which the doors are secured, the inner edges of the door 72 impinging upon the member 73 in the closed position. The doors provide direct access to the bays 66, and permit the unloading of the bins of wine bottles from the housing using forklift trucks or similar mechanical aids.

With reference to FIGS. 8 and 9, each of the doors 72 includes a rectangular tubular member 74 extending the length of the inside edge of each door and adapted to impinge upon the fixed housing member 73 when in the closed position. Extending outwardly from the member 73 is a plurality of latch plates 76, the latch plates 76 being disposed in parallel, spaced-apart pairs. Each pair of plates 76 extends generally co-linearly with the members 63 of the doors 72, as shown in FIG. 8. Each of the latch plates 76 includes a large locking shaft hole 77 extending therethrough, and a pair of detent holes 78 also extending therethrough. The latch plates 76 support a locking shaft 81 which extends from the top to the bottom of the housing 61 and is received through the aligned holes 77 of the plates 76. Secured to the shaft 81 are a plurality of blocks 82, each block disposed to be adjacent to a pair of latch plates 76. Extending from each block 72 are a pair of latch pins 83. The pins 83 are positioned to be received through the holes 78 of the plates 76. Furthermore, tne shaft 81 may be translated axially to remove the pins 83 from the aligned holes 78 of the plates.

Extending from each member 63 of each door 72 is a latch bar 84. The latch bars 84 extend toward the latch plates 76, and are disposed to be directly adjacent thereto. The latch bars 84 include spaced apart holes 86 which are positioned to receive the pins 83 extending from the block 82. It may be appreciated that the pins 83 extending through the latch plates 76 and through the latch bars 84 to firmly secure the doors 72 to the housing in the closed position. These latch assemblies are capable of supporting the large force caused by the combined weight of the large plurality of bottles disposed within the housing 61.

The present invention also includes at least one housing latch mechanism which rotationally immobilizes the housing with respect to the support frame. As shown in FIG. 13, the housing latch mechanism includes a rectangular tubing member 96 which extends through aligned holes in the frame member 34 and is disposed generally parallel to the frame members 31 and 32. Slidably disposed within the member 96 is a similar, smaller rectangular tubing member 97, the latter being somewhat longer than the former. One end of the member 97 is provided with an adjustable width bolt assembly 98 which is adapted to engage a channel-like cavity defined by member 94 on the lower end of the housing.

Extending outwardly from the frame member 34 is an arm 99 which supports a linking lever 101. The lever 101 is joined to the arm 99 by a pivot pin 102, and is freely rotatable thereabout. One end of the lever is joined in pivotal and translatable fashion by a pivot pin extending through the member 97 and through a slot 100 formed in the lever end portion.

Another arm 103 extends laterally from the member 34 and is disposed generally orthogonally to the arm 99. A pivot member is secured to the arm 103 by a pivot pin 107 and is freely rotatable thereabout. Extending laterally from the member 104 is a handle 106 which is provided to facilitate manual rotation thereof, for purposes which will be defined in the following description. A linking member 108 is joined at one end to the pivot member by a pivot pin 110 which is disposed eccentrically with respect to the pivot 107 of the member 108. The other end of the linking member is joined to the distal end of the member 101 in rotatable fashion by a pivot pin 109.

When the handle 106 is rotated to the position shown in solid line in FIG. 13, the linking member 108 drives the lever 101 to rotate and in turn cause the member 97 to translate toward the housing member 94. The bolt assembly engages the cavity in the member 94 and thus prevents rotation of the housing about its pivotted engagement with the frame. When the handle is rotated to the position indicated in phantom line, the related mechanism assumes the configuration also shown in phantom. That is, the member 104 pulls the linking lever and causes the lever 101 to rotate counterclockwise. This action in turn drives the member 97 to translate away from the member 94, freeing the bolt assembly 98 from the member 94 and permitting rotation of the housing, as described previously.

With reference to FIG. 10, the rectangular frame 31 may be rotated by the motor 53 so that it is disposed in the vertical position. The housing may be rotated by the motor 71 so that the doors 72 are disposed directly above the member 27 of the base assembly. In this position, the doors 72 may be released from their latch engagement by translating the shaft 81 axially so that the pins 83 clear the latch bars 84. The doors 72 may then be opened, affording complete access to the bays 66 within the housing 61. The bays 66 may be emptied of the bins of bottles by use of mechanically assisted fork lift devices or the like. The doors 72 may then be shut and latched, and the frame 31 may be rotated to a substantially horizontal position as shown in FIG. 11. The bays may then be loaded through the open upper end with new bins of bottles oriented with parallel, generally horizontal axes. The housing 61 may then be rotated slowly by the motor 71 to rotate the bottles of wine contained in the housing 61 about their parallel axes, as shown in FIG. 3. This action causes the precipitated sediments within the wine bottle to gradually sweep along the inner surface of the bottle and to agglomerate sediments which have become loosely attached to the inner wall of the bottle.

At the same time, the frame 31 may be driven by the motor 53 and the extendable strut assemblies 41 and 42 to gradually rotate toward a vertical disposition. An intermediate step of this rotation is depicted in FIG. 12. This action imparts to the wine bottle a rotation of their respective, parallel axes, as depicted in FIG. 2. It is intended that the neck portions of the bottles be inclined increasingly downwardly, so that the agglomerated, precipitated sediments will be caused to progress slowly toward the neck portion of the bottle. It may be appreciated that the housing 61 may be driven at an extremely slow rotational speed; i.e., one revolution per ten days, or the like. Likewise, the frame 31 may be driven slowly so that it moves from the horizontal configuration of FIG. 11 to the vertical configuration of FIG. 10 in a matter of several weeks.

When the procedures just described are completed, the apparatus of the present invention will be disposed as shown in FIG. 10, whereby the doors 72 may be reopened and the bins of wine bottles may be removed from the apparatus. The precipitated and agglomerated sediments disposed in the neck portions of the wine bottles adjacent to the openings thereof might then be removed by processes which form no part of the present invention.

I claim:

1. An apparatus for rotating and tipping a large plurality of bottles filled with wine, comprising a base frame, a pair of stanchions extending upwardly from said base frame, a support frame disposed between said stanchions, first means for joining said support frame to said stanchions in pivotal fashion to rotate about a first axis, a housing disposed within said support frame and adapted to support a large plurality of bottles disposed with their longitudinal axes extending in parallel fashion, second means for joining said housing to said support frame in pivotal fashion about a second axis, said second axis being non-parallel to said first axis, means for rotating said support frame about said first axis, including a pair of telescoping strut assemblies extending between said base frame and said support frame, each of said pair of strut assemblies including a first telescoping member secured at one end to said base frame, a second telescoping member slidably received in said first member and having a distal end pivotally joined to said support frame, a threaded shaft extending through said first and second telescoping members, means secured to said second telescoping member for engaging the threads of said shaft, and means for rotating said housing about said second axis.

2. The apparatus of claim 1, further including means for rotating in common said threaded shafts of both said telescoping strut assemblies.

3. The apparatus of claim 2, wherein said means for rotating includes a pair of sprocket wheels, each secured to one of said threaded shafts, a drive chain extending about said sprocket wheels, and a selectively actuated motor operatively engaging said drive chain.

4. The apparatus of claim 1, wherein said second means includes a pair of pivots extending from opposed ends of said support frame to said housing.

5. The apparatus of claim 4, wherein said means for rotating said housing about said second axis includes a sprocket wheel secured to one of said pivots, a drive chain engaged about said sprocket wheel, and selectively actuable motor means engaging said drive chain.

6. The apparatus of claim 5, wherein said last mentioned means includes a motor secured to said support frame adjacent to said one pivot.

7. The apparatus of claim 1, wherein said housing is divided into four bays having open upper ends, each bay adapted to receive through said upper end two bins of wine-filled bottles in stacked relationship, said doors being openable to unload said bins from said bays.

8. The apparatus of claim 1, further including stop means for limiting the rotational freedom of said support frame to approximately 90°.

9. The apparatus of claim 1, further including housing latch means for rotationally immobilizing said housing with respect to said support frame.

10. The apparatus of claim 9, wherein said last mentioned means includes a tube member translatably secured to said support frame and adapted to engage a recess in said housing.

11. The apparatus of claim 10, further including a linking lever mechanism for translating said tube member to engage and disengage said recess in said housing.

12. An apparatus for rotating and tipping a large plurality of bottles filled with wine, comprising a base frame, a pair of stanchions extending upwardly from said base frame, a support frame disposed between said stanchions, first means for joining said support frame to said stanchions in pivotal fashion to rotate about a first axis, a housing disposed within said support frame and adapted to support a large plurality of bottles disposed with their longitudinal axes extending in parallel fashion, second means for joining said housing to said support frame in pivotal fashion about a second axis, said second axis being non-parallel to said first axis, means for rotating said support frame about said first axis, means for rotating said housing about said second axis, said housing being configured as a generally rectangular prism having generally rectangular sides and opposed ends, said second means extending from said opposed ends to said support frame, one of said sides of said housing including a pair of doors hingedly secured at opposed edges of said one side and adapted to open outwardly therefrom, further including a structural member bisecting said one side and extending parallel to said opposed edges, said structural member being secured to said housing, latch means for releasably securing said doors to said structural member, including a plurality of latch plates secured to said structural member and extending outwardly therefrom, and a plurality of latch arms extending from said doors, each of said latch arms being disposed generally adjacent to at least one of said latch plates, said latch plates including aligned shaft holes for supporting a latch shaft extending therethrough in translatable fashion.

13. The apparatus of claim 12, further including a plurality of latch pins extending from said latch shaft and disposed adjacent to said latch plates and arms, said latch plates and arms including aligned latch pin holes for removably receiving said latch pins, said latch shaft being selectively translatable to engage or disengage said latch pins in said latch pin holes of said latch arms.

14. The apparatus of claim 13, wherein said latch shaft and said latch pins extend generally parallel to said structural member.

15. An apparatus for rotating and tipping a large plurality of bottles filled with wine, comprising base frame means, stanchion means extending upwardly from said base frame means, support frame means secured to said stanchion means, first means for joining said support frame to said stanchion means in pivotal fashion to rotate about a first axis, a housing secured to said support frame means and adapted to support a plurality of large containers holding a large plurality of bottles disposed with their longitudinal axes extending in parallel fashion, second means for joining said housing to said support frame means in pivotal fashion about a second axis, said second axis being non-parallel to said first axis, said housing having generally rectangular sides and opposed ends, one of said ends being substantially open to define a loading port adapted to receive large containers supporting said bottles in parallel orientation to a first direction, means for rotating said frame means about said first axis in a generally slow and continuous fashion to move said housing from a first position in which said loading port opens laterally to a second position in which said loading port opens upwardly, said means for rotating said frame means also reorientating said bottles into alignment with a second direction non-parallel to said first direction, door means formed in one of said sides for facilitating lateral removal of said large containers from said housing when said housing is in said second position without altering the second direction alignment of said bottles, and means for rotating said housing about said second axis.

* * * * *